(12) United States Patent
Hasegawa

(10) Patent No.: US 12,214,427 B2
(45) Date of Patent: Feb. 4, 2025

(54) INSERT AND CUTTING TOOL

(71) Applicant: KYOCERA CORPORATION, Kyoto (JP)

(72) Inventor: Mitsuru Hasegawa, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 586 days.

(21) Appl. No.: 17/437,841

(22) PCT Filed: Mar. 12, 2020

(86) PCT No.: PCT/JP2020/010848
§ 371 (c)(1),
(2) Date: Sep. 10, 2021

(87) PCT Pub. No.: WO2020/184668
PCT Pub. Date: Sep. 17, 2020

(65) Prior Publication Data
US 2022/0143715 A1  May 12, 2022

(30) Foreign Application Priority Data
Mar. 14, 2019 (JP) .................................. 2019-047249

(51) Int. Cl.
*B23B 27/10* (2006.01)
*B23B 27/16* (2006.01)

(52) U.S. Cl.
CPC ................................ *B23B 27/1611* (2013.01)

(58) Field of Classification Search
CPC ........ B23B 2200/086; B23B 2200/087; B23B 2200/325; B23B 2200/201;
(Continued)

(56) References Cited

U.S. PATENT DOCUMENTS

| 4,447,175 A | 5/1984 | Warren |
| 6,447,218 B1 | 9/2002 | Lagerberg |

(Continued)

FOREIGN PATENT DOCUMENTS

| EP | 1473102 A2 | 11/2004 |
| JP | 2002502711 A | 1/2002 |

(Continued)

OTHER PUBLICATIONS

CN 107175694 and English translation (Year: 2017).*
English translation of JP 2007216327 (Year: 2007).*

*Primary Examiner* — Alan Snyder
(74) *Attorney, Agent, or Firm* — HAUPTMAN HAM, LLP

(57) ABSTRACT

An insert includes a base which includes a first surface, a second surface connecting to the first surface, and a cutting edge located on at least a part of a ridgeline of the first surface and the second surface. The first surface includes a plurality of grooves located at a position away from the ridgeline and extended at an angle of 20-90° relative to the ridgeline. The grooves are away from the ridgeline in a range of 40-700 μm. A width W of the grooves is 50-700 μm, and a depth D of the grooves is 20-700 μm. Spacing S between the grooves adjacent to each other is 50-700 μm. A cutting tool includes a holder, which has a length extending from a first end to a second end and includes a pocket located on a side of the first end, and the insert is located in the pocket.

16 Claims, 10 Drawing Sheets

(58) Field of Classification Search
CPC ............ B23B 2260/072; B23B 27/005; B23B 27/143; B23B 27/1607; B23B 27/1618; B23B 27/1637; B23B 27/1648; B23B 27/1611; B23C 2200/086; B23C 2200/201; B23C 2200/326
See application file for complete search history.

(56) References Cited

U.S. PATENT DOCUMENTS

| | | |
|---|---|---|
| 2002/0136611 A1 | 9/2002 | Hartlohner |
| 2007/0077130 A1 | 4/2007 | Ley |
| 2012/0087746 A1 | 4/2012 | Fang et al. |
| 2015/0063931 A1* | 3/2015 | Wu .................... B23B 51/0493 408/59 |
| 2019/0232383 A1* | 8/2019 | Nakata .................... B23B 51/02 |
| 2019/0232432 A1* | 8/2019 | Kreisel ................ B23B 27/005 |
| 2020/0009664 A1 | 1/2020 | Ikeda |

FOREIGN PATENT DOCUMENTS

| | | | |
|---|---|---|---|
| JP | 2002542951 A | | 12/2002 |
| JP | 2007216327 A | * | 8/2007 |
| JP | 2013542083 A | | 11/2013 |
| JP | 5843102 B2 | | 1/2016 |
| JP | 2017189825 A | | 10/2017 |
| WO | 2018155705 A1 | | 8/2018 |
| WO | 2018181272 A1 | | 10/2018 |

\* cited by examiner

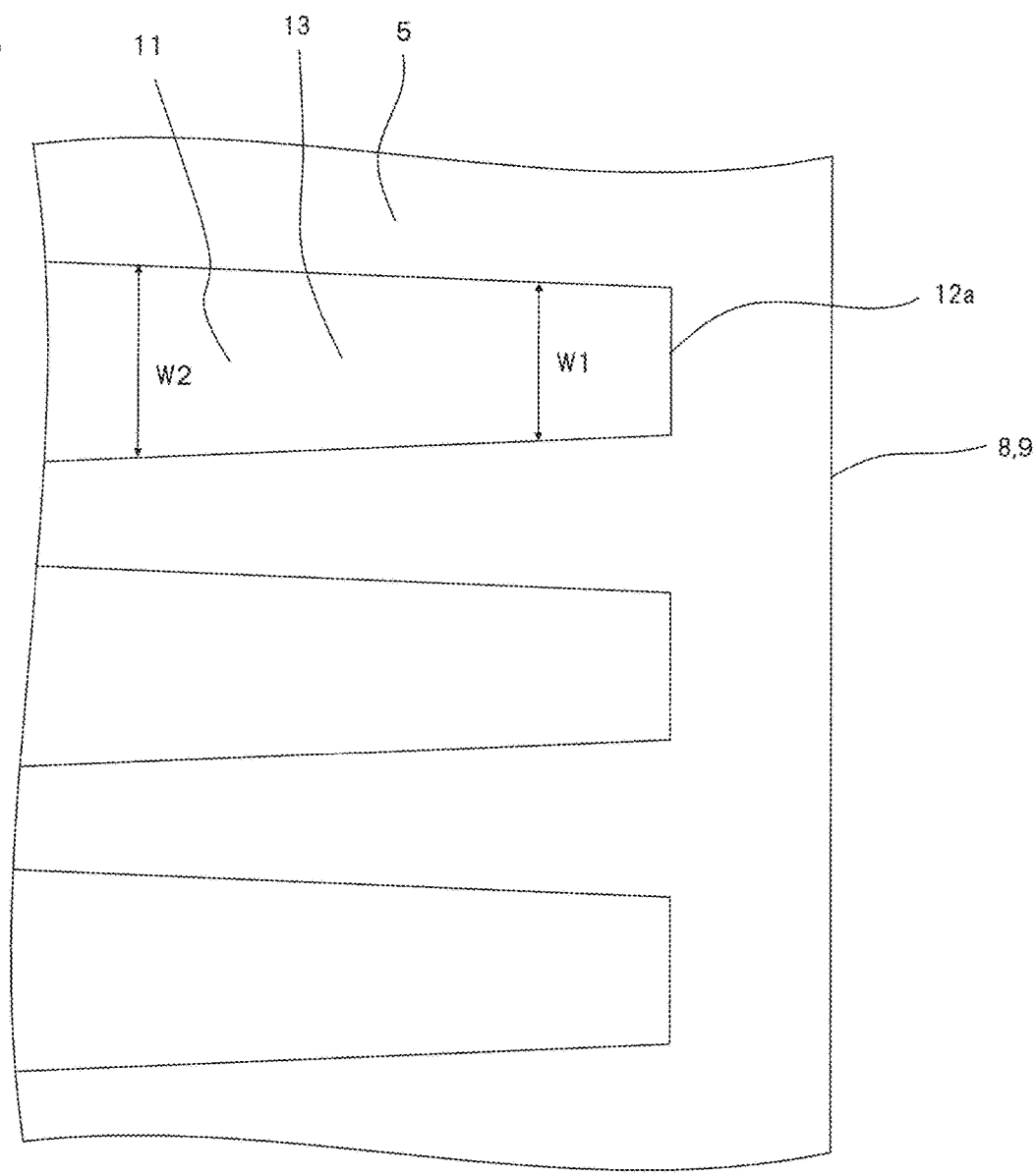

INSERT AND CUTTING TOOL

RELATED APPLICATIONS

The present application is a National Phase of International Application No. PCT/JP2020/010848 filed Mar. 12, 2020, which claims priority to Japanese Application No. 2019-047249, filed Mar. 14, 2019.

TECHNICAL FIELD

The present disclosure relates to an insert and a cutting tool.

BACKGROUND

Cemented carbide, cermet and ceramics are materials excellent in heat resistance and wear resistance, and are therefore used as an insert for a cutting tool. The insert is brought into contact with a workpiece in use at high speed, and the insert is therefore subjected to temperature rise.

For that reason, the insert and the workpiece are cooled with a coolant during a machining process. In order to enhance cooling effect thus obtained, a plurality of grooves that serve as a flow path for the coolant are disposed on a rake surface of the insert in Patent Document 1.

RELATED ART DOCUMENT

Patent Documents

Patent Document 1: Japanese Patent No. 5843102

SUMMARY

An insert of the present disclosure includes a base. The base includes a first surface, a second surface connecting to the first surface, and a cutting edge located on at least a part of a ridgeline of the first surface and the second surface. The first surface includes a plurality of grooves located at a position away from the ridgeline and at an angle of 20-90° relative to the ridgeline. The grooves are extended from a first end part being an end part closest to the cutting edge to a second end part being an end part most away from the cutting edge. The grooves are away from the ridgeline in a range of 40-700 μm. A width W of the grooves is 50-700 μm, and a depth D of the grooves is 20-700 μm. Spacing S between the grooves adjacent to each other is 50-700 μm. A cutting tool of the present disclosure includes a holder, which has a length extending from a first end to a second end and includes a pocket located on a side of the first end, and the insert located in the pocket.

BRIEF DESCRIPTION OF THE DRAWINGS

FIG. 7 is an enlarged view of main parts illustrating an embodiment of the inserts in the present disclosure;

EMBODIMENTS

<Inserts>

Figure 1:
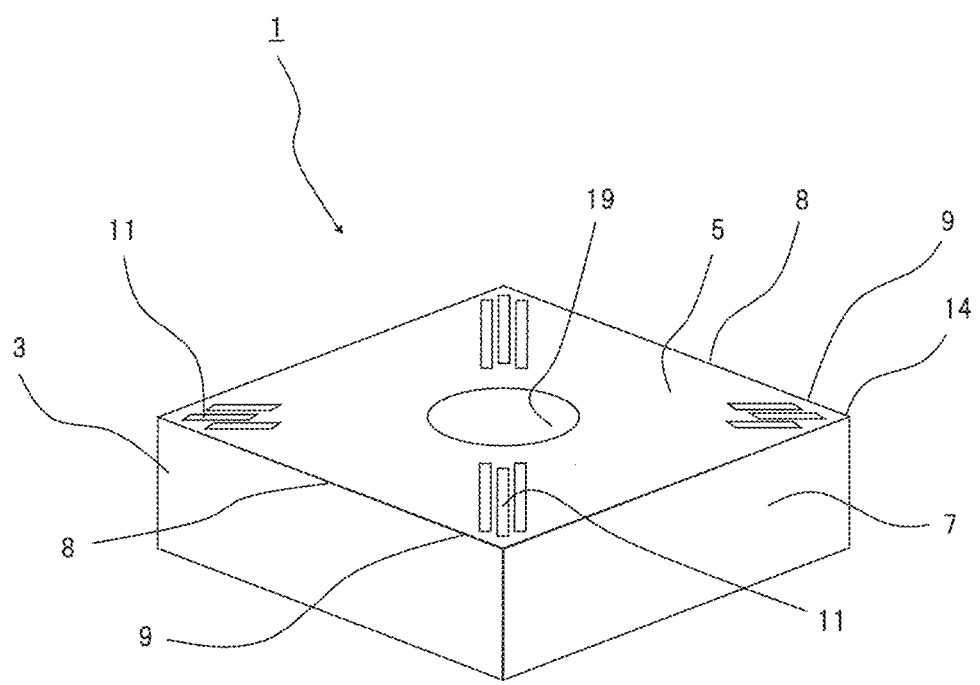
FIG. 1 is a perspective view illustrating an embodiment of inserts in the present disclosure.

Inserts in the present disclosure are described in detail below with reference to the drawings. For the sake of description, the drawings referred to in the following illustrate, in simplified form, only main members necessary for describing the embodiments. Hence, the inserts may include any arbitrary structural member not illustrated in the drawings referred to. Dimensions of the members in each of the drawings faithfully represent neither dimensions of actual structural members nor dimensional ratios of these members.

The insert 1 illustrated in FIG. 1 is an embodiment of an indexable cutting insert used by being attached to a predetermined position at a front end of a holder (not illustrated). The insert 1 includes a base 3 composed of cemented carbide, cermet, or the like. The insert 1 may include the base 3 composed of a so-called cemented carbide including WC, and Co, Ni and Fe used for a binding phase. The use of the base 3 leads to excellent welding resistance with respect to metal including Ti.

As used herein, "WC" denotes WC particles. The WC particles may have, for example, a mean particle diameter of 0.5-1.5 μm. The binding phase may be an iron group metal, such as Ni and Co. The base 3 may include 4-12 mass % of the binding phase. The base 3 may include only WC as a rest, besides the binding phase. In the present disclosure, a range, such as 4-12 mass %, denotes being a lower limit value or more and an upper limit value or less.

The insert 1 has a polygonal plate shape, and includes a first surface 5 and a second surface 7 connecting to the first surface 5. The insert 1 also includes a cutting edge 9 located on at least a part of a ridgeline 8 of the first surface 5 and the second surface 7. The first surface 5 corresponds to a rake surface 5, and the second surface 7 corresponds to a flank surface 7 in FIG. 1. These are also true for the following drawings. The first surface 5 may include a through hole 19 that penetrates the insert 1 vertically in order to fix the insert 1 to the holder described below. The cutting edge 9 may be located on at least a part of the ridgeline 8 in the insert 1. Specifically, the cutting edge 9 may be located on portions corresponding to two sides, or may be located in a ring shape on the whole of an outer peripheral part of the first surface 5.

Dimensions of the insert 1 are not particularly limited. For example, a length of one side of the first surface 5 is settable to approximately 5-20 mm, and a height between the first surface 5 and a surface (lower surface) located on a side opposite to the first surface 5 is settable to approximately 3-20 mm.

Figure 2:
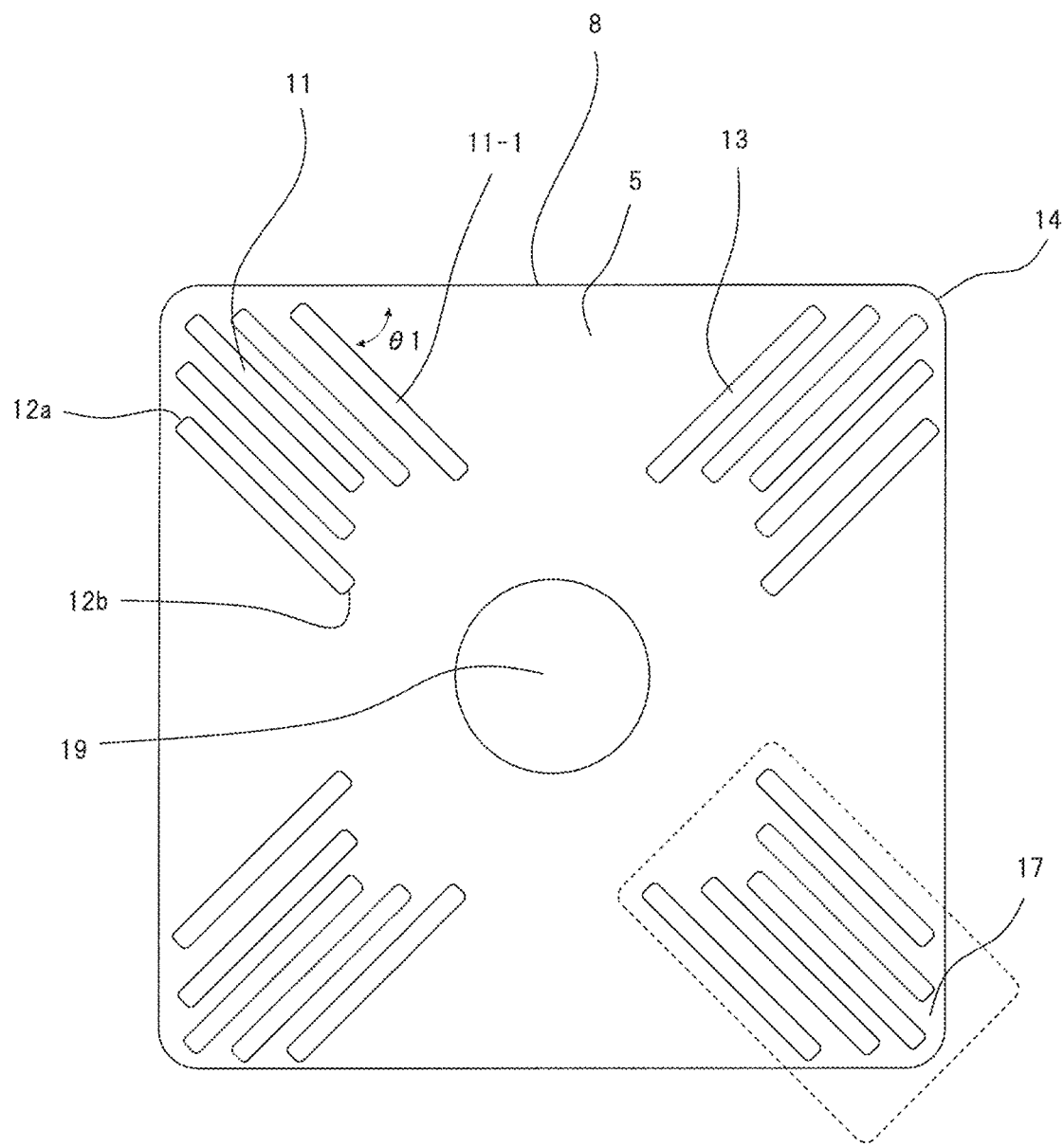
FIG. 2 is a top view illustrating an embodiment of the inserts in the present disclosure.

The insert 1 of the present disclosure includes a plurality of grooves 11 at a position away from the ridgeline 8 on the first surface 5 as in the top view of FIG. 2. The grooves 11 are extended from a first end part 12a that is an end part being closest to the ridgeline 8 toward a second end part 12b that is an end part most away from the cutting edge 9. These grooves 11 are located at an angle θ1 of 20-90° relative to the ridgeline 8. As used herein, the angle relative to the ridgeline 8 of the grooves 11 denotes a smaller angle from among angles at which an extending direction of the grooves 11 intersects with the cutting edge 9. Among a plurality of grooves 11, at least one of the grooves 11 may be located at the angle of 20-90° relative to the cutting edge 9. That is, all of the grooves 11 need not satisfy the above relationship.

By setting the angle to 20-90°, chips are less likely to stay in the grooves 11, and the chips tend to be discharged along the grooves 11. Of the cutting edge 9, the above angle of the grooves 11 located at a corner part 14 may be 90°.

A groove 11-1 in FIG. 2 is disposed at an angle of approximately 45° relative to the cutting edge 9.

The grooves 11 are away from the ridgeline 8 in a range of 40-700 μm. In other words, the distance between the grooves 11 and the ridgeline 8 is 40-700 μm. That is, the grooves 11 are not connected to the ridgeline 8. The cutting edge 9 is less prone to fracture if the distance between the grooves 11 and the ridgeline 8 is set to 40 μm or more. Cutting force can be lowered if the distance between the grooves 11 and the ridgeline 8 is set to 700 μm or less.

The distance between the grooves 11 and the ridgeline 8 may be set to 50-120 μm. With this configuration, the cutting edge 11 of the insert 1 is less prone to fracture and the cutting force is low.

The distance between the grooves 11 and the ridgeline 8 may be obtained by measuring a minimum distance between one groove 11 and the ridgeline 8. The insert 1 of the present disclosure may include one in which one of the grooves 11 is connected to the ridgeline 8.

Figure 3:
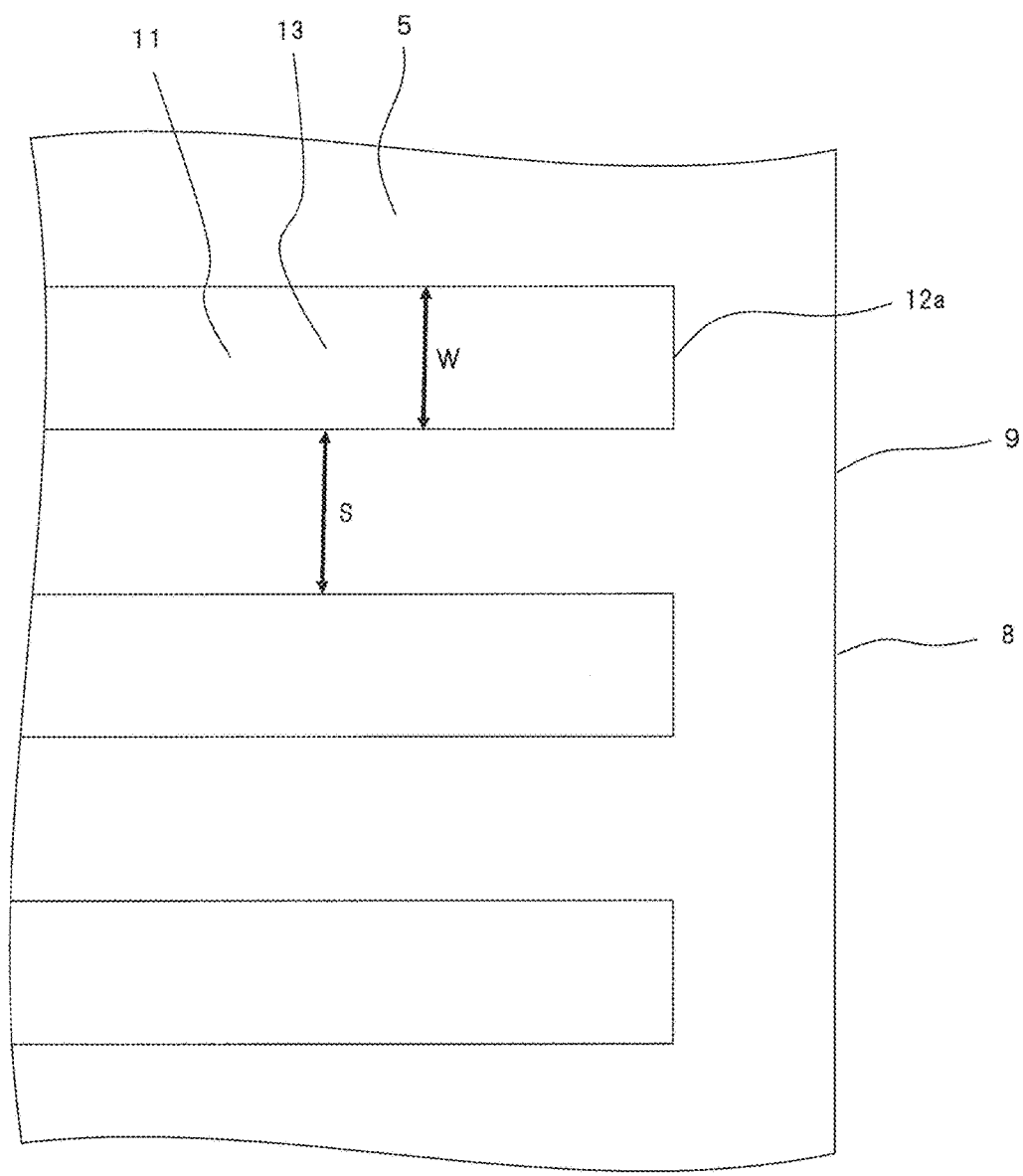
FIG. 3 is an enlarged view of main parts on an upper surface illustrating an embodiment of the inserts in the present disclosure.

FIG. 3 is an enlarged view of a neighborhood of the cutting edge 9 if the first surface 5 is viewed from above. The grooves 11 are located at the angle of 90° relative to the ridgeline 8 in an embodiment of FIG. 3. A width of the grooves 11 located on the surface of the first surface 5 is 50-700 μm.

Figure 4:
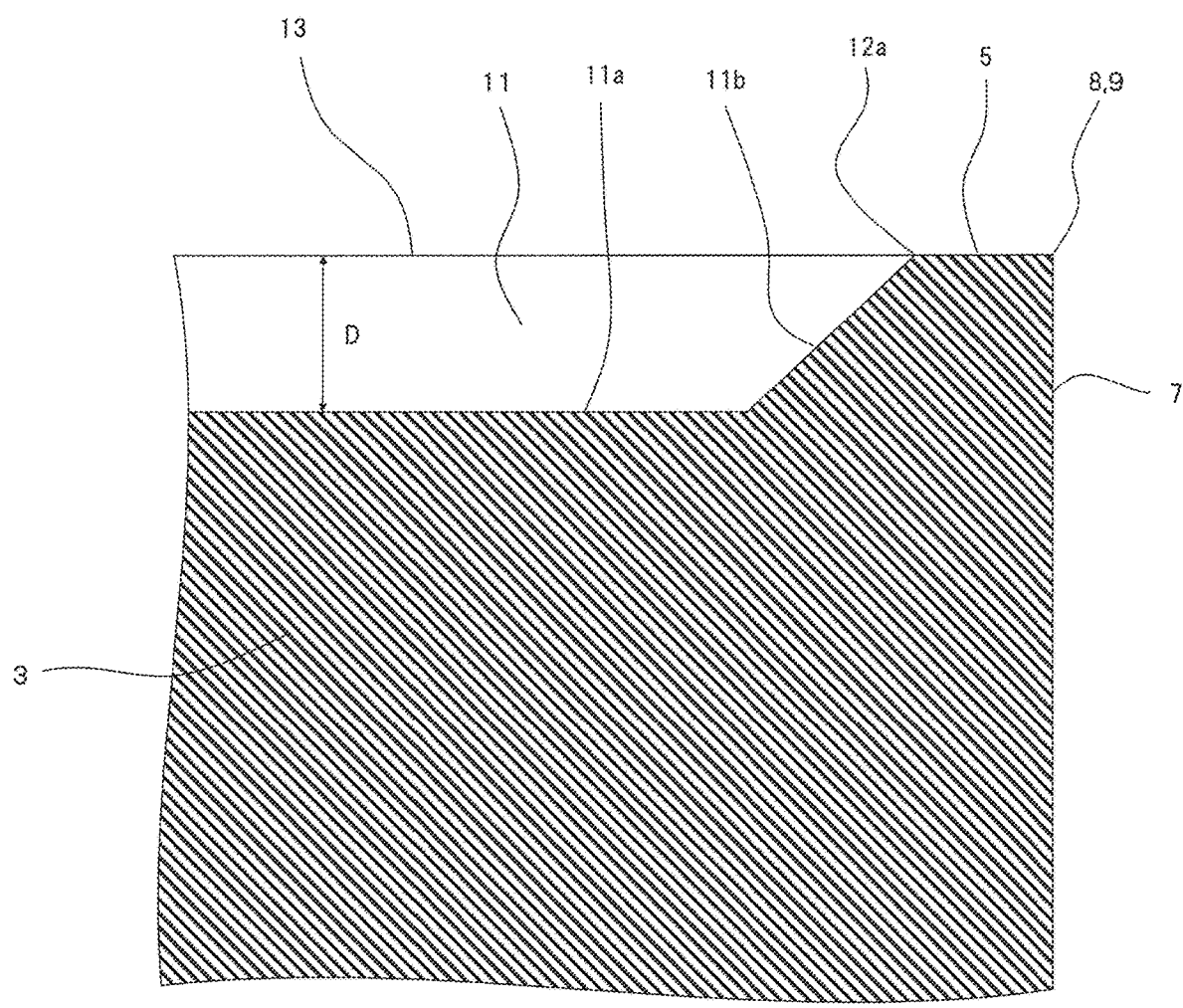
FIG. 4 is a sectional view of main parts illustrating an embodiment of the inserts in the present disclosure.

FIG. 4 is a cross section of the insert 1 which is vertical to the surface of the first surface 5 in the neighborhood of the ridgeline 8 that is the cutting edge 9. The groove 11 includes a bottom surface 11a and an opening 13. It also includes a raised surface 11b that connects to the bottom surface 11a on a side of the first end part 12a of the groove 11. A depth D of the groove 11 illustrated in FIG. 4 (refer to FIG. 4 with regard to "D", and the depth is a length in a depth direction in FIG. 3) is 20-700 μm. The spacing S between the grooves 11 adjacent to each other illustrated in FIG. 3 is 50-700 μm. An average value of the widths W of the grooves 11 and an average value of the depths D of the grooves 11 may fall within the above range.

The insert 1 of the present disclosure has low cutting force and has excellent fracture resistance, by having the above configuration. The insert 1 of the present disclosure is capable of carrying out a high-speed machining process because of being excellent in cooling effect.

Specifically, with the insert 1 including the grooves 11 thus configured, friction between the rake surface 5 and chips of the workpiece is low, resulting in low cutting force. Additionally, the cutting edge 9 has excellent fracture resistance because the grooves 11 do not reach the ridgeline 8. The grooves 11 serve as a micro channel for the coolant if the coolant is supplied toward the cutting edge 9, and it is therefore possible to carry out a high-speed machining.

The width W of the grooves 11 may be 50-200 μm. The depth D of the grooves 11 may be 50-200 μm. The spacing S between the grooves 11 adjacent to each other may be 50-200 μm.

Figure 5:
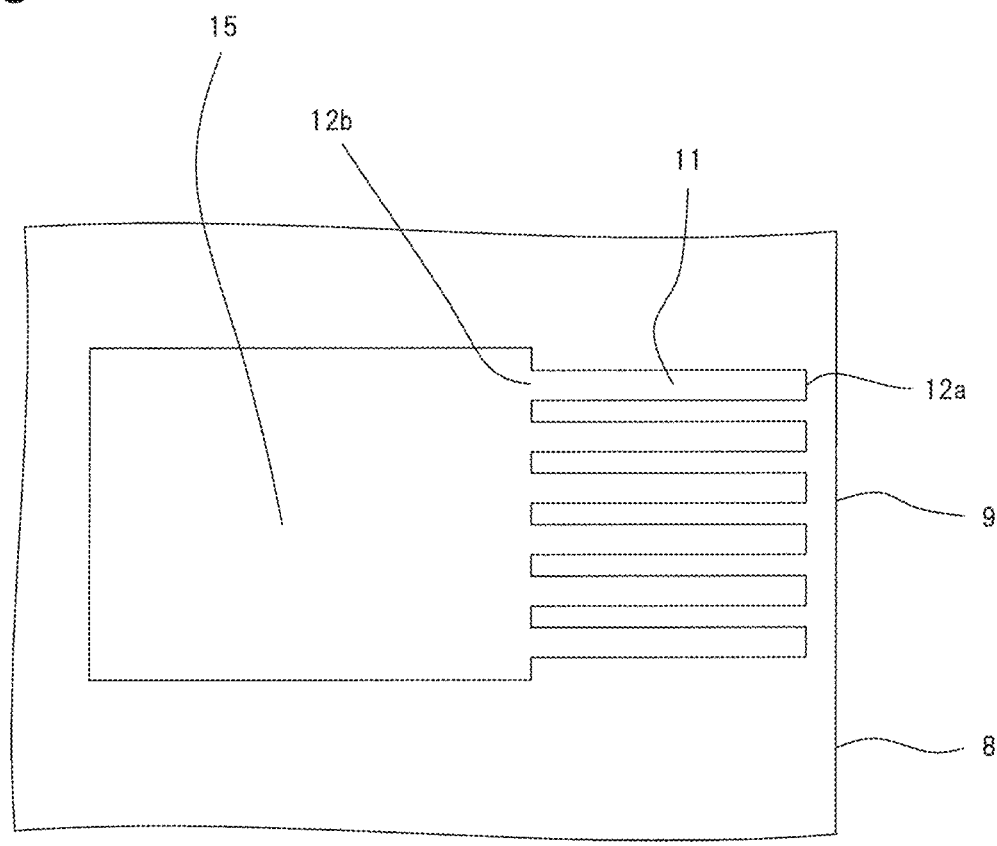
FIG. 5 is an enlarged view of main parts on an upper surface illustrating an embodiment of the inserts in the present disclosure.

The raised surface 11b is located on a side of the first end part 12a of the groove 11, whereas no raised surface may be located on a side of the second end part 12b of the groove 11. For example, the groove 11 may be connected to, for example, other space, such as a concave part 15, in the second end part 12b, and the second end part 12b in the groove 11 may be opened as illustrated in FIG. 5.

For example, a coating layer (not illustrated) including a TiCN layer (not illustrated) or an $Al_2O_3$ layer (not illustrated) may be disposed on a surface of the base 3 in the insert 1 of the present disclosure. The base 3 may be exposed on at least a first region 17 which is in the neighborhood of the cutting edge 9 and the grooves 11 on the first surface 5 in the insert 1 of the present disclosure. In other words, the coating layer may not be present on the surface of the base 3 in the neighborhood of the cutting edge 9 and the grooves 11 on the rake surface 5. As used herein, the first region 17 denotes a region located within 0.5 mm from the cutting edge 9 and the grooves 11. Alternatively, the coating layer may not be present on the entire surface of the base 3.

With this configuration, it is possible to prevent the workpiece from being welded to the insert 1 even in the case of machining metal including, for example, titanium having high welding performance.

A ratio (S/W) of the spacing S of the grooves 11 adjacent to each other to the width W of the grooves 11 may be 0.9-2.0 in the insert 1 of the present disclosure. With this configuration, the insert 1 has an excellent balance between friction resistance and cooling effect.

A ratio (D/W) of the depth D of the grooves 11 to the width W of the grooves 11 may be 0.5-2.0. With this configuration, the insert 1 has an excellent balance between friction resistance and cooling effect. Chips are less likely be caught in the grooves 11, thereby making it easier to maintain performance of the insert 1.

Figure 6A:
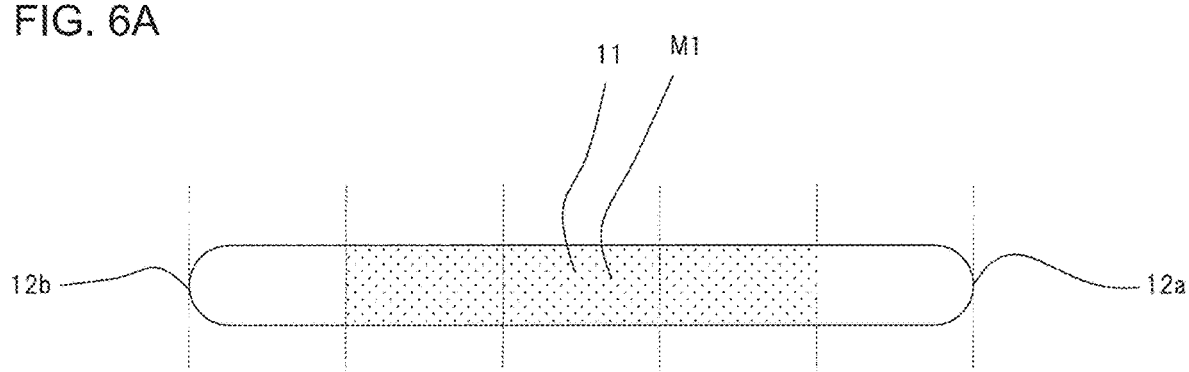
FIGS. 6A and 6B are schematic diagrams illustrating an embodiment of the grooves of the inserts in the present disclosure.

As used herein, the width W of the grooves 11 in the present disclosure denotes an average value of the widths W of the grooves 11. That is, if the grooves 11 have approximately the same width W from the first end part 12a to the second end part 12b as illustrated in FIG. 6A, the grooves 11 are divided into five in the extending direction thereof, and the average value of the widths W of the grooves 11 in a region M1 having a length of 20-80% as viewed from the first end part 12a is obtained.

Figure 6B:
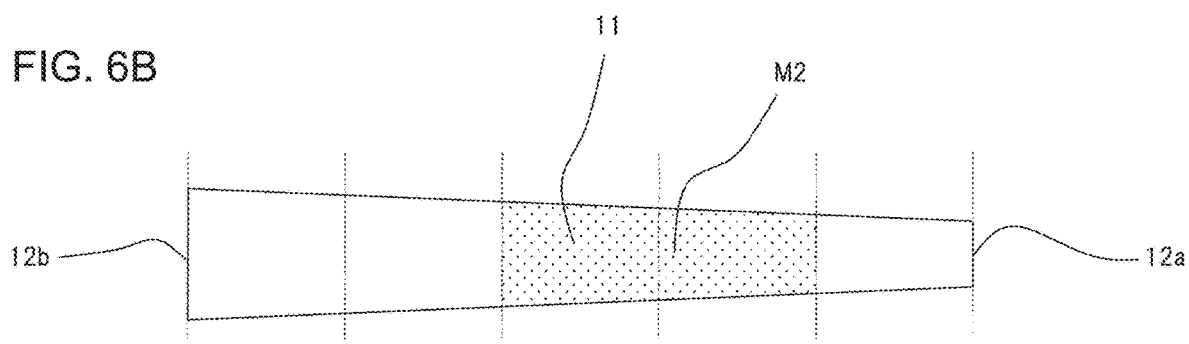

If the widths of the grooves 11 are changed at an approximately constant rate from the first end part 12a to the second end part 12b as illustrated in FIG. 6B, the grooves 11 are divided into five in the extending direction thereof, and an average value of the widths W of the grooves 11 in a region M2 having a length of 20-60% as viewed from the first end part 12a is obtained.

The depths D of the grooves 11 and the spacings S of the grooves 11 adjacent to each other may be measured according to similar standards. The reason for measuring the W in the regions of the grooves 11 which are located near the first end part 12a is that the insert 1 of the present disclosure is capable of producing operational effects as long as the widths W of the grooves 11 in the region near the cutting edge 9 fall within the range set to the insert 1 of the present disclosure.

As illustrated in FIG. 7, W1 indicates a width of the groove 11 at a position located 0.5 mm away from the first end part 12a, and W2 indicates a width of the groove 11 at a position located 2.0 mm away from the first end part 12a. It may be preferable to set to W1<W2. With this configuration, the width of the groove 11 becomes small in the vicinity of the first end part 12a, and the coolant is therefore likely to be discharged vigorously from the groove 11.

Figure 8:
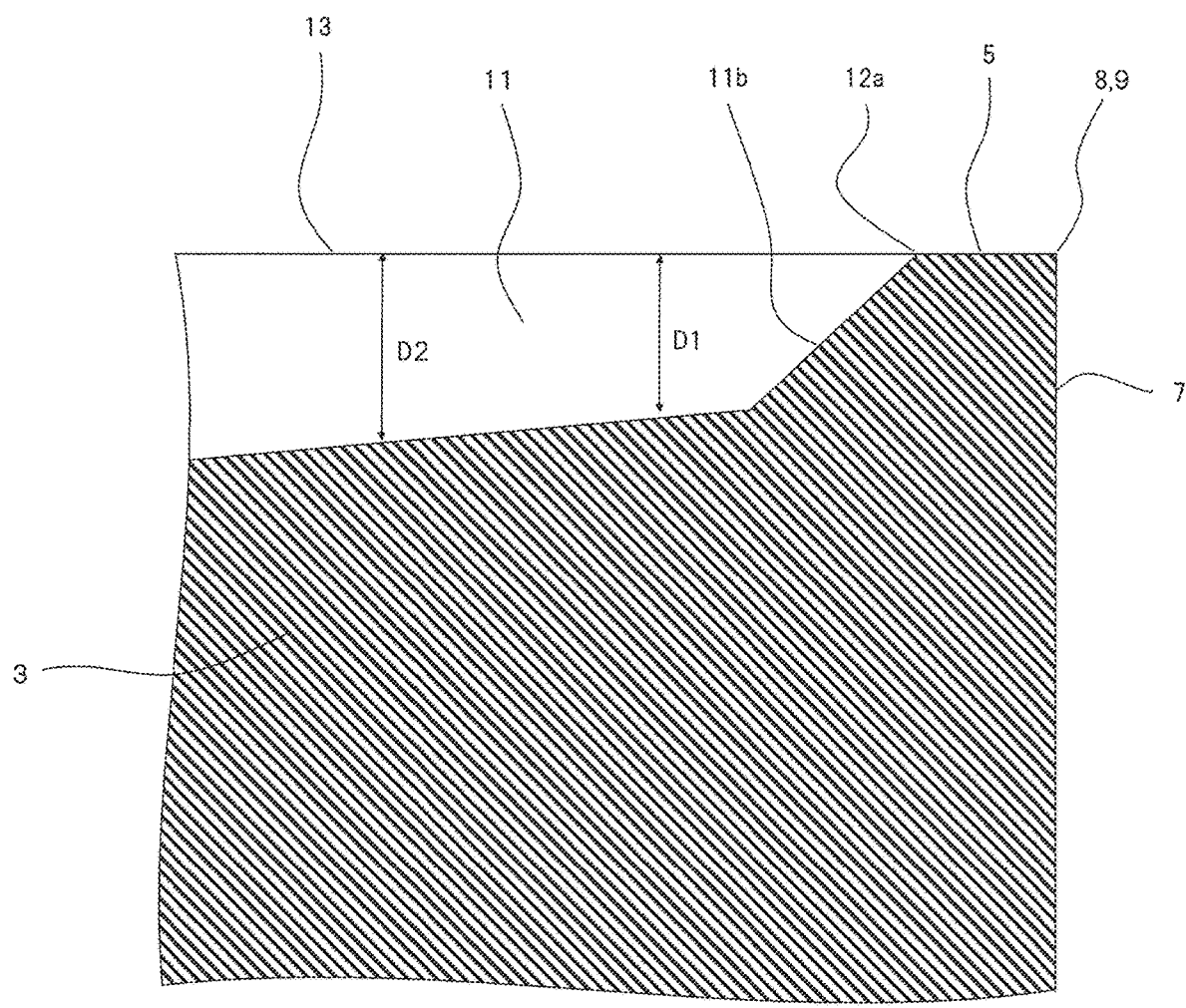
FIG. 8 is a sectional view of main parts illustrating an embodiment of the inserts in the present disclosure.

As illustrated in FIG. 8, D1 indicates a depth of the groove 11 at a position located 0.5 mm away from the first end part 12a, and D2 indicates a depth of the groove 11 at a position located 2.0 mm away from the first end part 12a. It may be preferable to set to D1<D2. With this configuration, the depth of the groove 11 becomes small in the vicinity of the first end part 12a, and the coolant is therefore likely to be discharged vigorously from the groove 11.

The groove 11 may satisfy a relationship of (D2/D1)> (W2/W1). With this configuration, a change in the depth D of the groove 11 is larger than a change in the width W of the groove 11, and the coolant is therefore likely to be discharged vigorously from the groove 11.

A shape of the groove 11 (hereinafter also referred to as a cross-sectional shape of the groove 11) in a cross section of the base 3 which intersects at right angles in the extending direction of the groove 11 may be a shape in which a width of the opening 13 is larger than a width of the bottom surface 11a, such as a semicircular shape, a triangular shape, or a trapezoidal shape.

For example, after manufacturing cemented carbide in the shape of the insert including no grooves 11 in the insert 1 having such grooves 11 on the rake surface 5, the grooves 11 may be formed on the rake surface 5 so as to serve as the grooves 11 in the insert 1 of the present disclosure, for example, by drilling or using a laser beam. Alternatively, the insert 1 is also obtainable by manufacturing a molded body including concave parts that serve as the grooves 11 after sintering by using a mold including convex parts corresponding to the grooves 11, followed by sintering the molded body.

It is possible to measure the shape of the grooves 11 by using, for example, a shape analysis laser microscope. The measuring is made using VK-X1000 manufactured by KEYENCE CORPORATION in the present disclosure. Measurement conditions are as follows.

Measurement mode: Simple measurement
Scanning mode: Focus variation
Measurement size: Standard
Pitch: 4.50 μm
Brightness: 70
To enable noise region processing: ON
Coaxial vertical: 100
Ring illumination: OFF
Z-axis mode: Recommended setting
Z measurement distance fixing: OFF
Automatic upper and lower limits: ON
Head: R
Objective lens name: Plan
Objective lens magnification: 10×
NA: 0.3
WD: 16.5 mm
Brightness mode: Automatic
Brightness (automatic): 70
Brightness (manual): 2
Edge enhancement: 5

<Cutting Tools>

Cutting tools of the present disclosure are described below with reference to the drawings.

Figure 9:
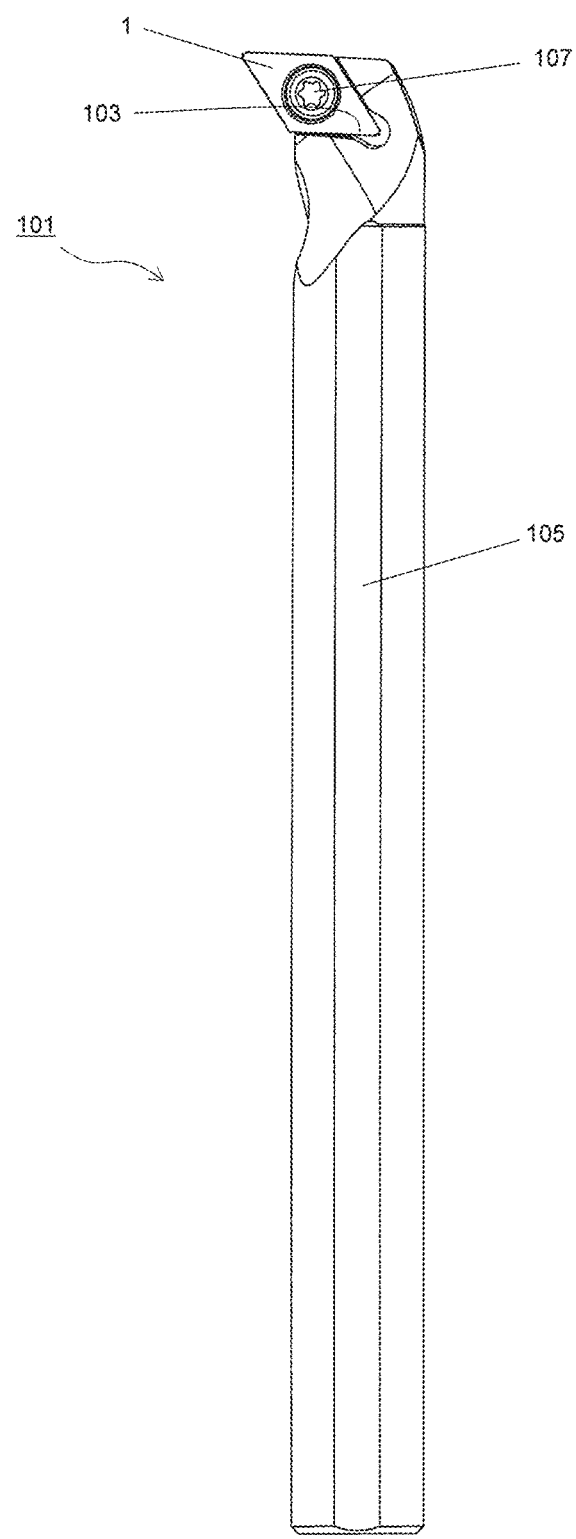
FIG. 9 is a plan view illustrating an embodiment of cutting tools in the present disclosure.

The cutting tool 101 of the present disclosure is, for example, a bar-shaped body extended from a first end (an upper end in FIG. 9) to a second end (a lower end in FIG. 9) as illustrated in FIG. 9.

The cutting tool 101 includes a holder 105 which has a length from the first end (front end) to the second end, and which includes a pocket 103 located on a side of the first end, and the insert 1 located in the pocket 103 as illustrated in FIG. 9. The cutting tool 101 includes the insert 1 and is therefore capable of performing a stable machining process for a long term. The grooves 11 are omitted in FIG. 9.

The pocket 103 is a part which permits attachment of the insert 1 and which includes a seating surface parallel to a lower surface of the holder 105, and a constraining lateral surface vertical or inclined relative to the seating surface. The pocket 103 opens on a side of the first end of the holder 105.

The insert 1 is located in the pocket 103. The lower surface of the insert 1 may be directly in contact with the pocket 103. Alternatively, a sheet (not illustrated) may be held between the insert 1 and the pocket 103.

The insert 1 is attached to the holder 105 in the following manner. That is, at least a part of the ridgeline 8 where the first surface 5 being the rake surface 5 intersects with the second surface 7 being the flank surface 7 which is used as the cutting edge 9 is protruded outward from the holder 105. The insert 1 is attached to the holder 105 by a screw 107 in the present embodiment. Specifically, the insert 1 is attached to the holder 105 by inserting the screw 107 into the through hole 19 of the insert 1, and by inserting a front end of the screw 107 into a screw hole (not illustrated) formed in the pocket 103 so as to engage screw parts each other.

The cutting tool 101 of the present disclosure may include a hose (not illustrated) whose front end includes a nozzle in order to supply a coolant to the cutting edge 9. A pump for supplying the coolant is connected to the hose.

Figure 10:
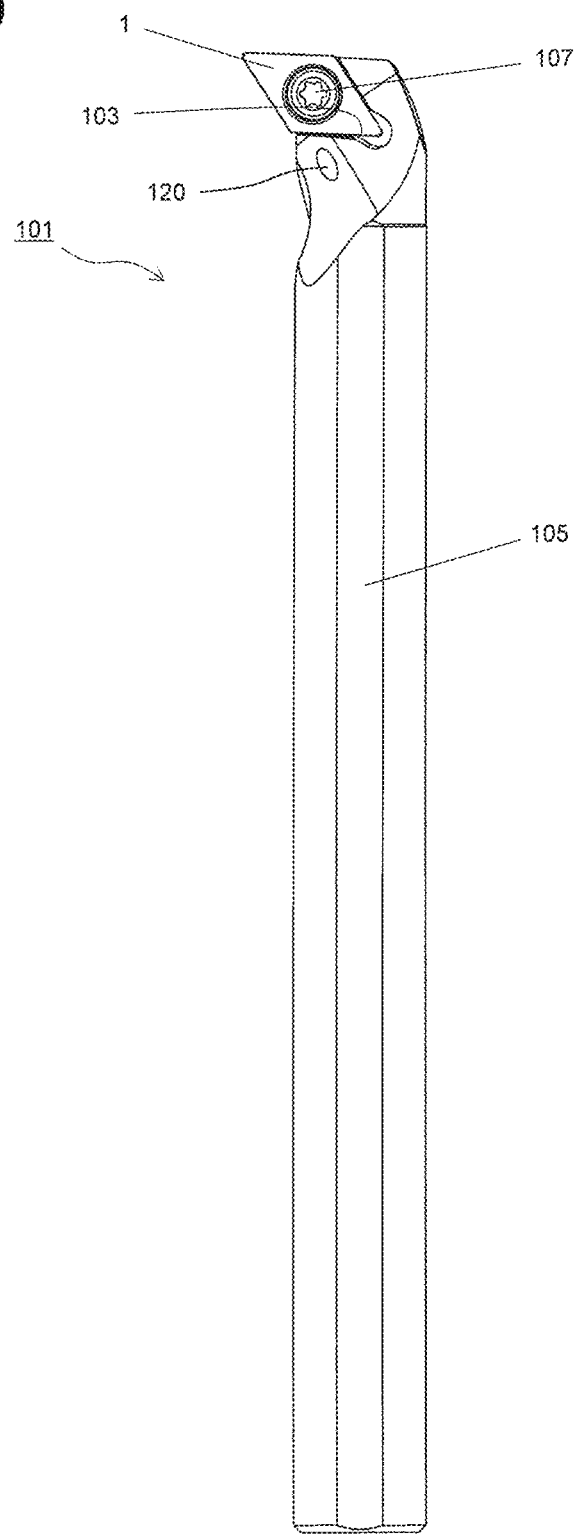
FIG. 10 is a plan view illustrating an embodiment of cutting tools in the present disclosure.

The holder 105 may include the nozzle 120 for supplying the coolant to the cutting edge 9 in the cutting tool 101 of the present disclosure as illustrated in FIG. 10. A spout of the nozzle 120 located near the insert 1 facilitates the supply of the coolant to the cutting edge 9. The nozzle 120 may be fixed to a part of the holder 105. Alternatively, the holder 105 may include a hole used as the nozzle 120 as illustrated in FIG. 10. The coolant discharged from the nozzle 120 may be, for example, an aqueous coolant or oil based coolant.

The nozzle 120 may be connected to the pump (not illustrated) so as to carry out a discharge at a pressure of 0.5-20 MPa. Particularly, a higher-speed machining is achievable at a pressure of 10 MPa or more.

For example, steel and cast iron are usable as a material of the holder 105. Of these materials, steel having enhanced toughness may be used.

The cutting tool for use in a so-called turning process is illustrated in the embodiment. Examples of the turning process include internal process, external process and grooving process. The cutting tool is not limited to ones which are used for the turning process. For example, the insert 1 of the above embodiment may be used as a cutting tool used for milling process.

EXAMPLES

Examples of the inserts of the present disclosure are described below. The inserts of the present disclosure include a base composed of cemented carbide including WC and a binding phase.

Different grooves were formed on the rake surface of the base in the shape of SNGN120408 in these examples. Inserts including no grooves were also manufactured as a reference example.

Using the inserts that were different in shape, a workpiece (Ti-6Al-4V) was cut out to examine a relationship between the shape of the groove and the life of the insert, as well as a relationship between pressure of a coolant discharged from the nozzle and the life of the insert.

Table 1 presents the presence/absence of groove, the shape of groove, the kind of the insert used, coolant pressure, and evaluation of machining. A relation between groove and cutting edge corresponds to a shape in which the grooves are extended toward a corner part as illustrated in FIGS. 1 and 2.

The cutting conditions are described below.
<Cutting Conditions>
Cutting speed: 100 m/min
Feed rate: 0.1 mm/rev
Depth of cut: 0.5 mm
Others: Using water-soluble coolant
Coolant pressure: 10 MPa
Evaluation Item: Cutting distance until a cutting edge falls off

TABLE 1

| Sample No. | Clearance (μm) | Width W (μm) | Spacing S (μm) | Depth D (μm) | S/W | D/W | Cutting Distance (m) | Condition of Cutting Edge |
|---|---|---|---|---|---|---|---|---|
| 1 | 0 | 100 | 100 | 100 | 1.00 | 1.00 | 10 | Fracture |
| 2 | 30 | 100 | 100 | 100 | 1.00 | 1.00 | 2000 | High Friction |
| 3 | 40 | 100 | 100 | 100 | 1.00 | 1.00 | 3900 | Good |
| 4 | 50 | 100 | 100 | 100 | 1.00 | 1.00 | 4400 | Good |
| 5 | 100 | 100 | 100 | 100 | 1.00 | 1.00 | 4800 | Good |
| 6 | 700 | 100 | 100 | 100 | 1.00 | 1.00 | 3500 | Good |
| 7 | 1000 | 100 | 100 | 100 | 1.00 | 1.00 | 2100 | High Friction |
| 8 | 100 | 40 | 100 | 100 | 2.50 | 2.50 | 2200 | High Friction |
| 9 | 100 | 50 | 100 | 100 | 2.00 | 2.00 | 3800 | Good |
| 10 | 100 | 200 | 100 | 100 | 0.50 | 0.50 | 3000 | Good |
| 11 | 100 | 700 | 100 | 100 | 0.14 | 0.14 | 2800 | Good |
| 12 | 100 | 900 | 100 | 100 | 0.11 | 0.11 | 1200 | High Friction |
| 13 | 100 | 100 | 40 | 100 | 0.40 | 1.00 | 1900 | High Friction |
| 14 | 100 | 100 | 50 | 100 | 0.50 | 1.00 | 2900 | Good |
| 15 | 100 | 100 | 200 | 100 | 2.00 | 1.00 | 3000 | Good |
| 16 | 100 | 100 | 700 | 100 | 7.00 | 1.00 | 2600 | Good |
| 17 | 100 | 100 | 900 | 100 | 9.00 | 1.00 | 2300 | High Friction |
| 18 | 100 | 100 | 100 | 40 | 1.00 | 0.40 | 2100 | High Friction |
| 19 | 100 | 100 | 100 | 50 | 1.00 | 0.50 | 2800 | Good |
| 20 | 100 | 100 | 100 | 200 | 1.00 | 2.00 | 3800 | Good |
| 21 | 100 | 100 | 100 | 700 | 1.00 | 7.00 | 3400 | Good |
| 22 | 100 | 100 | 100 | 900 | 1.00 | 9.00 | 2000 | High Friction |

A surface of the base was exposed and no so-called coating film was disposed in all of samples presented in Table 1. A similar evaluation was made on samples including the coating film, and the results indicated that these samples had lower welding performance than those including no coating film.

The inserts and the cutting tools each having the configuration of the present disclosure had a long life. The relationship between coolant pressure and cutting distance was examined on Sample No. 2 in Table 1. The results indicated that the cutting distance became longer with increasing the coolant pressure. There was a slight change in cutting distance if the coolant pressure was 10 MPa or more.

The inserts of the present disclosure and the cutting tools respectively using the inserts are not limited to the above configuration, and various improvements and changes may be made without departing from the scope of the present disclosure.

The invention claimed is:

1. An insert, comprising a base,
the base comprising
a first surface,
a second surface connecting to the first surface, and
a cutting edge located on at least a part of a ridgeline of the first surface and the second surface,
wherein
the first surface comprises a plurality of grooves which is located at a position away from the ridgeline and at an angle of 20-90° relative to the ridgeline,
each of the plurality of grooves has a first end part being an end part closest to the cutting edge and a second end part being an end part most away from the cutting edge, and extends from the first end part to the second end part,
each of the plurality of grooves comprises an opening, a bottom surface facing toward the opening, and a raised surface directly connected to the bottom surface and the first end part, wherein the raised surface is gradually inclined from the bottom surface to the first end part, and in a direction from the first end part to the second end part, a length of the bottom surface is larger than a length of the raised surface,
the plurality of grooves is away from the ridgeline in a range of 40-700 μm, and
a width W of each of the plurality of grooves is 50-700 μm, a depth D of each of the plurality of grooves is 20-700 μm, and spacing S between grooves adjacent to each other is 50-700 μm.

2. The insert according to claim 1, wherein a ratio (S/W) of the spacing S between the grooves adjacent to each other to the width W of each of the plurality of grooves is 0.9-2.0.

3. The insert according to claim 1, wherein in each of the plurality of grooves, a ratio (D/W) of the depth D to the width W is 0.5-2.0.

4. The insert according to claim 1, wherein a relationship of W1<W2 is satisfied in which W1 is a width of a first portion of one of the plurality of grooves at a position located 0.5 mm away from the first end part, and W2 is a width of a second portion of the one of the plurality of grooves at a position located 2.0 mm away from the first end part.

5. The insert according to claim 1, wherein a relationship of D1<D2 is satisfied in which D1 is a depth of a first portion of one of the plurality of grooves at a position located 0.5 mm away from the first end part, and D2 is a depth of a second portion of the one of the plurality of grooves at a position located 2.0 mm away from the first end part.

6. The insert according to claim 1, wherein a relationship of (D2/D1)>(W2/W1) is satisfied in which
W1 is a width of a first portion of one of the plurality of grooves at a position located 0.5 mm away from the first end part, and W2 is a width of a second portion of the one of the plurality of grooves at a position located 2.0 mm away from the first end part, and
D1 is a depth of the first portion of the one of the plurality of grooves at a position located 0.5 mm away from the first end part, and D2 is a depth of the second portion of the one of the plurality of grooves at a position located 2.0 mm away from the first end part.

7. The insert according to claim 6, wherein (D2/D1)/(W2/W1) is 1.5 or more.

8. The insert according to claim 1, wherein a maximum width of each of the plurality of grooves is a width of the opening.

9. The insert according to claim 1, wherein the base comprises a hard phase comprising WC, and a binding phase comprising Co.

10. The insert according to claim 1, wherein the base is exposed in a first region of the first surface in a range within 0.5 mm from the cutting edge and the plurality of grooves.

11. The insert according to claim 1, wherein the plurality of grooves is located at a corner part of the base.

12. The insert according to claim 1, wherein the plurality of grooves is away from the ridgeline in a range of 50-120 μm.

13. The insert according to claim 1, wherein the first surface further comprises a concave part connected to the second end parts of the plurality of grooves.

14. The insert according to claim 1, wherein in at least one of the plurality of grooves, the bottom surface gradually inclines upward from a side of the second end part to the raised surface.

15. A cutting tool, comprising:
a holder which has a length extending from a first end to a second end, and which comprises a pocket located on a side of the first end; and
an insert, the insert being located in the pocket,
wherein
the insert includes a base, the base comprising
a first surface,
a second surface connecting to the first surface, and
a cutting edge located on at least a part of a ridgeline of the first surface and the second surface,
the first surface comprises a plurality of grooves which is located at a position away from the ridgeline and at an angle of 20-90° relative to the ridgeline,
each of the plurality of grooves has a first end part being an end part closest to the cutting edge and a second end part being an end part most away from the cutting edge, and extends from the first end part to the second end part,
each of the plurality of grooves comprises an opening, a bottom surface facing toward the opening, and a raised surface directly connected to the bottom surface and the first end part, wherein the raised surface is gradually inclined from the bottom surface to the first end part, and in a direction from the first end part to the second end part, a length of the bottom surface is larger than a length of the raised surface,
the plurality of grooves is away from the ridgeline in a range of 40-700 μm, and
a width W of each of the plurality of grooves is 50-700 μm, a depth D of each of the plurality of grooves is 20-700 μm, and spacing S between grooves adjacent to each other is 50-700 μm.

16. The cutting tool according to claim 15, wherein the holder comprises a flow path configured to allow a coolant to pass through.

* * * * *